(12) United States Patent
Jang (10) Patent No.: US 8,861,039 B2
(45) Date of Patent: Oct. 14, 2014

(54) IMAGE FORMING APPARATUS AND METHOD OF SENDING EMAIL THEREIN

(75) Inventor: Young-dae Jang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 333 days.

(21) Appl. No.: 13/137,254

(22) Filed: Aug. 1, 2011

(65) Prior Publication Data

US 2012/0081758 A1    Apr. 5, 2012

(30) Foreign Application Priority Data

Sep. 30, 2010    (KR) .......................... 10-2010-0095396

(51) Int. Cl.
*H04N 1/32*    (2006.01)
*H04N 1/00*    (2006.01)

(52) U.S. Cl.
CPC .... *H04N 1/00212* (2013.01); *H04N 2201/3221* (2013.01); *H04N 1/32422* (2013.01); *H04N 1/32096* (2013.01); *H04N 1/00225* (2013.01)
USPC ........................................ 358/402; 358/1.14

(58) Field of Classification Search
USPC ............... 358/1.13, 400, 474, 403, 404, 1.14, 358/402; 379/100.01, 100.02, 100.05, 379/100.08, 100.09
See application file for complete search history.

(56) References Cited

U.S. PATENT DOCUMENTS

| | | | | |
|---|---|---|---|---|
| 6,493,103 | B2* | 12/2002 | Toyoda et al. | 358/1.15 |
| 8,102,553 | B2* | 1/2012 | Shozaki et al. | 358/1.15 |
| 2002/0054323 | A1* | 5/2002 | Yamada et al. | 358/1.15 |
| 2004/0184088 | A1* | 9/2004 | Ogawa | 358/1.15 |
| 2005/0041860 | A1* | 2/2005 | Jager | 382/173 |
| 2005/0174606 | A1* | 8/2005 | Matsueda et al. | 358/402 |
| 2008/0225335 | A1* | 9/2008 | Shozaki et al. | 358/1.15 |
| 2010/0157349 | A1* | 6/2010 | Hong | 358/1.14 |
| 2010/0281127 | A1* | 11/2010 | Serdy et al. | 709/206 |
| 2010/0306545 | A1* | 12/2010 | Seki | 713/175 |
| 2011/0252106 | A1* | 10/2011 | Kobayashi | 709/206 |
| 2011/0307446 | A1* | 12/2011 | Miyazaki et al. | 707/634 |
| 2011/0310418 | A1* | 12/2011 | Miyata | 358/1.13 |

* cited by examiner

*Primary Examiner* — Jerome Grant, II
(74) *Attorney, Agent, or Firm* — Staas & Halsey LLP (57) ABSTRACT

An image forming apparatus and a method of sending email therein. The method includes generating a scan image by scanning a document to be sent to an email address via an email; generating a job ID mapped to information included in the email and the generated scan image; sending the email including the job ID and the generated scan image via a mail server; and when the email is returned, resending the email by reading out the scan image and the information included in the email mapped to the job ID according to a user inputting the job ID included in the returned email.

17 Claims, 11 Drawing Sheets

```
------=_Part_10381_29929014.1276740505722
MiME-Version: 1.0
Content-Type: multipart/related;

------=_Part_10381_29929014.1276740505722
Content-Type: Text/Html
charset="us_ascii"
Content-Transfer-Encoding: 8Bit
<html>
  <body>
    <p>
      Document sent to You!!
    </p>
    <p>
      (From MFP Job ID  5021542)          —401
    </p>
  </body>
</html>
------=_Part_10381_29929014.1276740505722--
```

FIG. 4B

| Message-ID | <123456.0123456789012345678@mail.com> |
|---|---|
| Date | Thu, 17 Jun 2010 02:08:08 +0000 (GMT) |
| From | john.doe<john.doe@samsung.com> |
| Reply-To | john.doe@samsung.com |
| To | jane.doe<jane.doe@samsung.com> |
| Subject | Hello! |
| MIME-Version | 1.0 |
| Content-Type | multipart/mixed; |
| X-MTR | 20100617020451784@john.doe |
| MsgKey | 20100617020451784@john.doe |
| X-EPLocale | ascii |
| X-Sender | |
| X-EPWebemail-Msg-Type | personal |
| X-EPWebemail-Delivery-Method | |
| X-Priority | 3 |
| X-USE-EXTERN-BODY | |
| X-EPExternalAttachSize | 36791868 |
| X-EPWebmail-Reply-Demand | 0 |
| Disposition-notification-to | john.doe@samsung.com |
| X-EPApproval-Locale | |
| X-EPHeader | ML |
| X-EPTrcode | |
| X-EPTrName | |
| X-MLAttribute | |
| X-RootMTR | 20100617020451784@john.doe |
| X-ParentMTR | |

FIG. 4C

```
------=_Part_10381_29929014.1276740505722
MiME-Version: 1.0
Content-Type: multipart/related;

------=_Part_10381_29929014.1276740505722
Content-Type: Text/Html
charset="us_ascii"
Content-Transfer-Encoding: 8Bit
<html>
  <body>
    <p>
      Document sent to You!!
    </p>
    <p>
      <a href="http://127.0.0.1/scantoemail.xoa?jobid=5021542">—403
      (From MFP Job ID : 5021542)—404
    </p>
  </body>
</html>
------=_Part_10381_29929014.1276740505722—
```

FIG. 5

Date: 17 Jun 2010 02:08:28 -0000
From: MAILER-DAEMON@samsung.com
To: john.doe@samsung.com Title: failure notice
<!—type = text -->
Hi. This is the qmail-send program at mail.com.
I'm afraid I wasn't able to deliver your message to the following addresses.
This is a permanent error; I've given up. Sorry it didn't work out/

<jane.doe@samsung.com>:
xx.xx.xx.xx failed after I sent the message.
Remote host said: 554 delivery error: dd This user doesn't have a samsung.com account (@samsung.com)

--- Below this line is a copy of the message

Sender: <john.doe@samsung.com>
Date: 2010-06-17 02:08 (GMT+00:00)
Title: hello!

Document sent to You!!

(From MFP Job ID: 5021542) — 501

IMAGE FORMING APPARATUS AND METHOD OF SENDING EMAIL THEREIN

CROSS-REFERENCE TO RELATED APPLICATIONS

This application claims the priority benefit of Korean Patent Application No. 10-2010-0095396, filed on Sep. 30, 2010, in the Korean Intellectual Property Office, the disclosure of which is incorporated herein in its entirety by reference.

BACKGROUND

1. Field

The present disclosure generally relates to an image forming apparatus and a method of sending email therein, and more particularly, to a method of resending email when sending of an email in an image forming apparatus fails and the email is returned, and an image forming apparatus for performing the method.

2. Description of the Related Art

Image forming apparatuses include office automation equipment, for example, a multi-function product (MFP) that can simultaneously perform various functions of equipment such as a printer, a copy machine, a scanner, a facsimile, and the like. MFPs may perform each function of a printer, a scanner, a copy machine, a facsimile, and the like individually, or may perform combined functions, for example, a scanner function and a facsimile function. Recently, image forming apparatuses including a network function used to communicate with terminal equipment, such as a personal computer (PC), are widely used.

SUMMARY

The present disclosure provides an image forming apparatus and a method of sending email therein.

According to an aspect of embodiments, there is provided a method of performing a scan-to-email function for sending email to which a scan image is attached in an image forming apparatus, the method including: generating a scan image by scanning a document to be sent to an email address via an email; generating a job identifier (job ID) mapped to information included in the email and the generated scan image; sending the email including the job ID and the generated scan image via a mail server; and when the email is returned, resending the email by reading out the scan image and the information included in the email mapped to the job ID according to a user inputting the job ID included in the returned email.

According to another aspect, there is provided a computer readable recording medium having embodied thereon a computer program for executing the method.

According to another aspect of the embodiments, there is provided an image forming apparatus having a scan-to-email function for sending email to which a scan image is attached, the image forming apparatus including: a scanning unit for generating a scan image by scanning a document to be sent to an email address via an email; a job ID managing unit for generating a job ID mapped to information included in the email and the generated scan image; and an email managing unit for sending the email including the job ID and the generated scan image via a mail server, wherein when the email is returned, the email is resent by reading out the scan image and the information included in the email mapped to the job ID according to a user inputting the job ID included in the returned email.

BRIEF DESCRIPTION OF THE DRAWINGS

The above and other features and advantages of the present disclosure will become more apparent by describing in detail exemplary embodiments thereof with reference to the attached drawings in which.

DETAILED DESCRIPTION

Now, exemplary embodiments will be described in detail with reference to the accompanying drawings.

Figure 1:
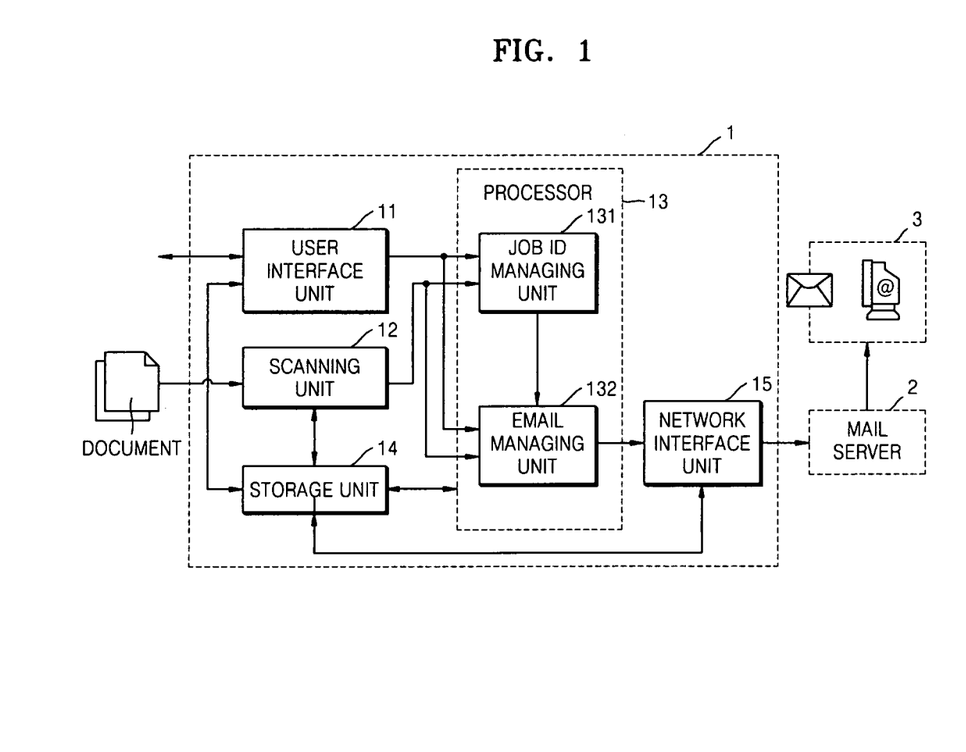
FIG. 1 is a block diagram illustrating an image forming apparatus, according to an embodiment.

FIG. 1 is a block diagram illustrating an image forming apparatus 1, according to an embodiment.

Referring to FIG. 1, the image forming apparatus 1 includes a user interface unit 11, a scanning unit 12, a processor 13, a storage unit 14, and a network interface unit 15. The processor 13 includes a job ID managing unit 131 and an email managing unit 132. The processor 13 may be configured as an array including a plurality of logic gates or as a combination of a general-purpose microprocessor and a memory storing a program that may be implemented in the microprocessor. In addition, one of ordinary skill in the art would understand that the processor 13 may be configured as another type of hardware.

The image forming apparatus 1 refers to an apparatus that is connected to a host device (not shown) and that performs printing by forming a visible image on a printing medium such as a sheet of printing paper according to a digital signal input by the host device. The image forming apparatus 1 may be a copy machine, a scanner, a multi-function product (MFP), or the like. In particular, the MFP refers to office automation equipment capable of simultaneously performing various functions of equipment such as a printer, a copy machine, a scanner, a facsimile, and the like. The MFP may perform each function of a printer, a scanner, a copy machine, a facsimile, and the like individually, or may perform combined functions, for example, a scanner function and a facsimile function. In addition, recently, there exists an MFP having a scan-to-email function in which a scan image scanned through a scanning function of the MFP is attached to an email and sent to a user via a network.

Here, a scan-to-email function refers to a function in which the image forming apparatus 1 sends an email to which a scanned image is attached to an external terminal device 3 via a mail server 2.

Figure 2:
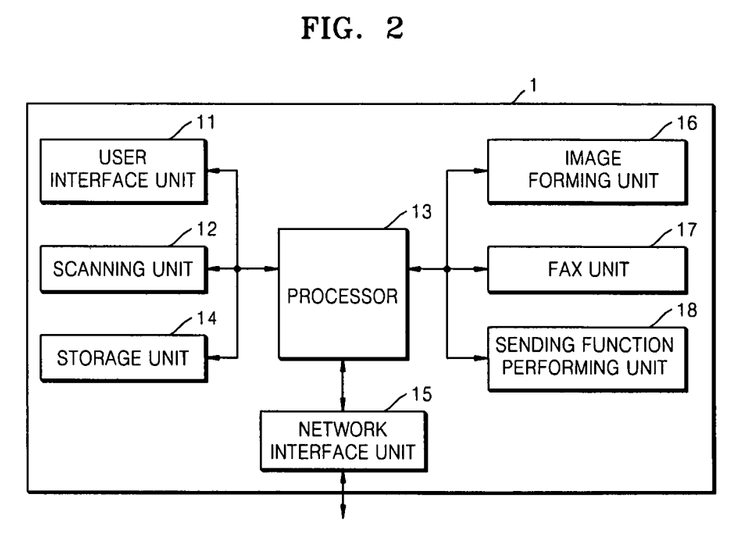
FIG. 2 is a block diagram illustrating a configuration of the image forming apparatus of FIG. 1, according to an embodiment.

FIG. 2 is a block diagram illustrating a configuration of the image forming apparatus 1, according to an embodiment;

FIG. 2 illustrates components not shown in FIG. 1, that is, an image forming unit 16, a fax unit 17, a sending function performing unit 18. The image forming unit 16 forms and prints an image by performing processes such as charging, writing, developing, transferring, fusing, and the like. The fax unit 17 performs a fax function. The sending function performing unit 18 performs a transmission function with a server connected to the network interface unit 15, a portable storage medium, a computer system, and the like.

However, only the hardware components illustrated in FIG. 1 will be described below in order to prevent the current embodiment from being unclear. One of ordinary skill in the art would understand that, besides the hardware components illustrated in FIG. 1, other general-purpose hardware components like the components illustrated in FIG. 2 may be included.

Referring back to FIG. 1, when an email is returned, the image forming apparatus 1 of the current embodiment may facilitate resending of the email, unlike a conventional image forming apparatus. Conventionally, when an email is sent normally, the email is not returned to a sender's email address. However, if an email is failed to be sent due to problems such as a server breakdown or a user setting error in a scan-to-email operation, the email is discarded or returned. Accordingly, a user should repeat the same scan-to-email operation, which may include scanning, inputting of an email address, or the like, in order to send the same email.

However, when an email is returned to a sender's address due to a server problem or a problem in terms of connection when performing the scan-to-email function, without having to repeatedly perform a job for resending the same email, the image forming apparatus 1 of the current embodiment may resend the same email. Hereinafter, the image forming apparatus 1 having such a function will be described in more detail.

The user interface unit 11 is an apparatus in which a user inputs scanning information of a document and email information into the image forming apparatus 1. In more detail, the user interface unit 11 receives information from the user by using an information input device such as a keyboard, a mouse, a touch screen, or a voice recognition device. In addition, the user interface unit 11 reports information regarding processes in the image forming apparatus 1 to the user by using an apparatus for displaying visual information, for example, a display, a liquid crystal display (LCD) screen, a light-emitting diode (LED), or a gradation-marked apparatus, or an apparatus for displaying auditory information, for example, a speaker.

The user interface unit 11 receives scan options that are used to perform a scanning operation for attaching a document to an email and that are input through the user interface unit 11 by the user when performing the scan-to-email function. For example, the scan options include options for setting resolution, a file format, a paper size, brightness, a color mode, and the like. Afterwards, the user interface unit 11 receives information to be included in an email from the user. For example, the information to be included in the email may be a sender's email address, a receiver's email address, an email title, an email message, or the like.

The scanning unit 12 generates a scan image by scanning a document to be sent to an email address. The document is scanned according to the scan options input through the user interface unit 11. Since the scanning unit 12 has the same function as a general scanner, a process of generating a scan image by scanning a document is apparent to one of ordinary skill in the art, and thus a detailed description thereof will be omitted.

The processor 13 controls all functions performed in the image forming apparatus 1 and performs various functions. However, only functions related to the current embodiment will be described below. The processor 13 of the current embodiment includes the job ID managing unit 131 and the email managing unit 132, as described above.

The job ID managing unit 131 generates a job identifier (job ID) mapped to information included in an email and input through the user interface unit 11 and a scan image generated in the scanning unit 12. Whenever a new scan-to-email operation is performed by a user, a unique job ID is assigned thereto.

Information regarding a user using the image forming apparatus 1, scan options input through the user interface unit 11, information included in an email, and storage information of a scan image generated in the scanning unit 12 are mapped to a job ID.

Figure 3:
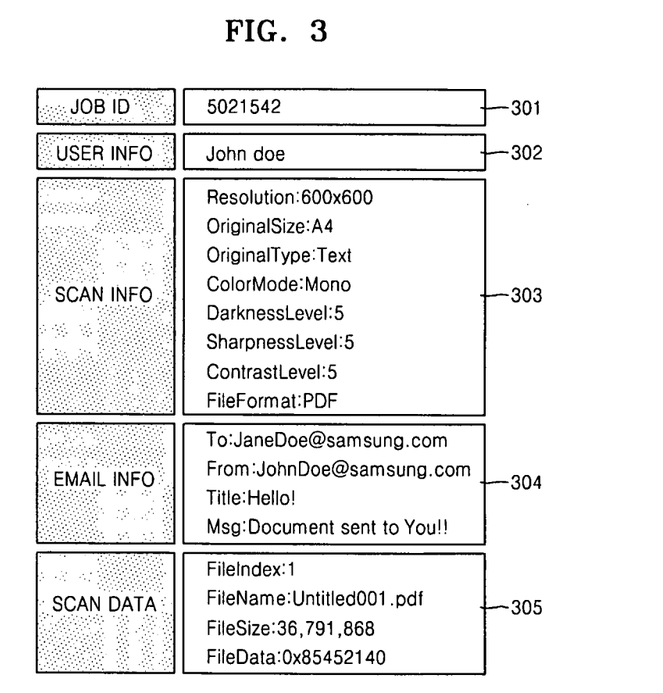
FIG. 3 illustrates information mapped to a job identifier, according to an embodiment.

FIG. 3 illustrates information mapped to a job ID, according to an embodiment.

Referring to FIG. 3, information mapped to the job ID includes information regarding the job ID (JOB ID) 301, user information (USER INFO) 302, scan information (SCAN INFO) 303 indicating scan options, email information (EMAIL INFO) 304 indicating information included in an email such as sender and receiver's email addresses, and scan data (SCAN DATA) 305 indicating storage information of a scan image. In FIG. 3, for example, information is mapped to the job ID 301 of 5021542. The characters indicating the job ID 301 may be changed according to a user environment.

Since the above information is mapped to the job ID 301, if a user knows only the job ID 301, the user may use previously obtained results before performing a scan-to-email operation at his/her desired time through the job ID 301.

Referring back to FIG. 1, the storage unit 14 stores scan options input through the user interface unit 11, information included in an email, a scan image generated in the scanning unit 12, and a job ID generated in the job ID managing unit 131.

The email managing unit 132 sends an email including a job ID and a scan image via the mail server 2. In detail, an email written by a user in the email managing unit 132 is sent to the mail server 2 disposed outside of the image forming apparatus 1 through the network interface unit 15 under the control of the email managing unit 132.

Email data written in the email managing unit 132 is divided into an email header and an email body. When writing the email data in the email managing unit 132, a job ID is included in an email body of the email data.

Figure 4A:
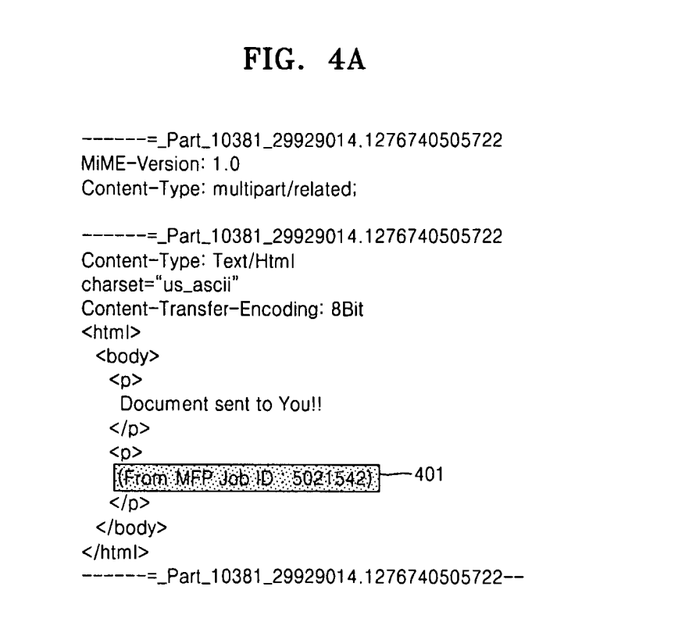
FIG. 4A illustrates an email body, according to an embodiment.

FIG. 4A illustrates an email body, according to an embodiment.

Figure 4B:
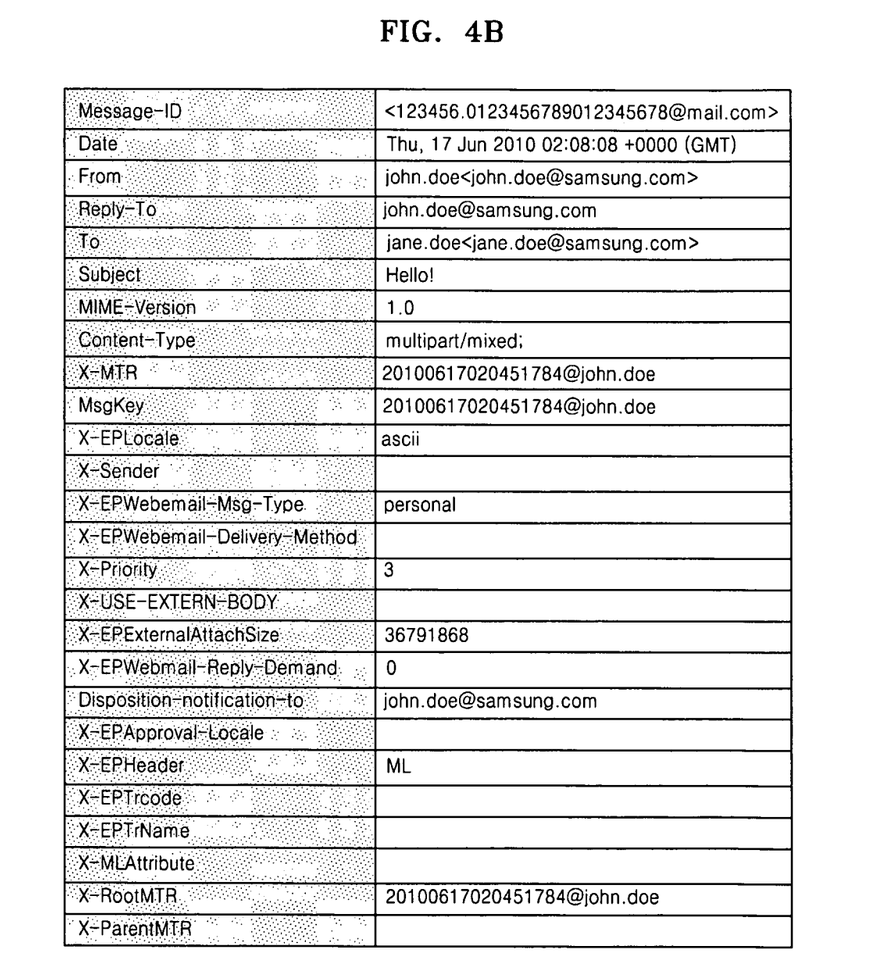
FIG. 4B illustrates an email header, according to an embodiment.

Referring to FIG. 4A, an email body includes a job ID 401 generated in the job ID managing unit 131. Accordingly, when sending an email including the email body, the email including the job ID 401 is sent. FIG. 4B illustrates an email header, according to an embodiment.

General forms of an email body and an email header are obvious to one of ordinary skill in the art, and thus a detailed description thereof will be omitted.

Referring back to FIG. 1, the email managing unit 132 forms an email based on email data such as an email body and an email header illustrated in FIGS. 4A and 4B, and then sends the email to a receiver's email address via the mail server 2.

Unlike the conventional method, according to the current embodiment, a job ID is additionally included in an email body to be sent, so that a user may know which scan-to-email operation has been performed through the job ID included in the email body when the email is returned. Accordingly, a scan image and information included in the email that are mapped to the job ID and previously sent may be easily read out by using the job ID.

Figure 4C:
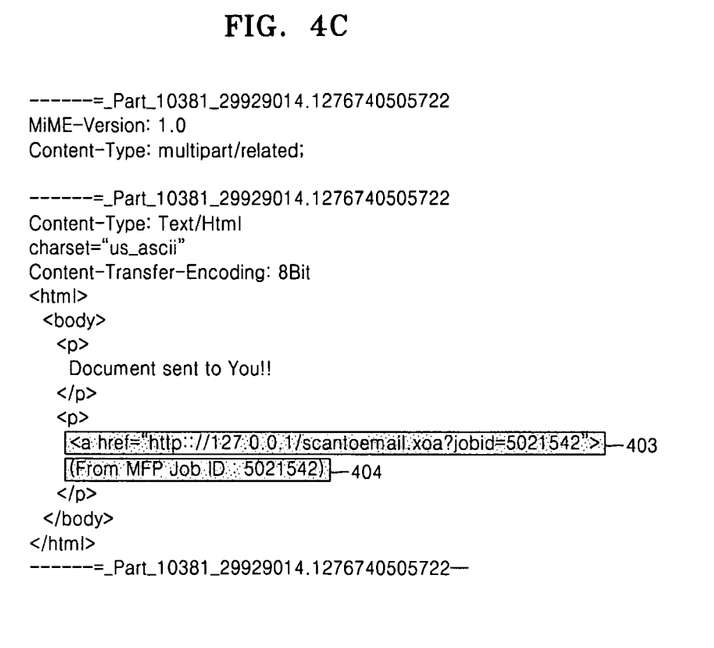
FIG. 4C illustrates an email body, according to another embodiment.

FIG. 4C illustrates an email body, according to another embodiment.

The image forming apparatus 1 having a network function includes a web server (not shown) capable of setting a job to be performed in the image forming apparatus 1. For example, the image forming apparatus 1 includes the web server having a network address such as an IP address.

A user may access the web server through an external terminal device such as a PC (not shown) via a web link 403. Accordingly, the user may remotely input various options to be set in the image forming apparatus 1 through a web page connected to the web server of the image forming apparatus 1 via the web link 403 by using a web browser in the PC, instead of directly inputting various options through the user interface unit 11 of the image forming apparatus 1. In addition, the web page connected to the web server via the web link 403 displays results obtained in the image forming apparatus 1, and thus the user may recognize the results obtained in the image forming apparatus 1 through the web page.

Referring to FIG. 4C, unlike FIG. 4A, the email managing unit 132 forms an email body by including not only a job ID 404 but also web link 403, and then sends an email including the email body. Accordingly, the user may remotely access the image forming apparatus 1 by using the web link 403 through the PC, and may remotely recognize the job ID 404 mapped to the present email.

Referring back to FIG. 1, according to the embodiments of FIGS. 4A and 4C, when an email is normally sent, the sent email is not returned to a sender's email address. However, when an email is failed to be sent due to problems such as a server breakdown or a user's input error, the sent email is returned to a sender's email address.

Since the email managing unit 132 sends an email while including a job ID in an email body thereof, the returned email includes the job ID. For example, when a user opens the returned email through the user interface unit 11, the user interface unit 11 displays a previously written email message including a job ID included in the returned email, but the user may not recognize the job ID. However, since the user interface unit 11 also displays a web link, the user may recognize not only the job ID but also the web link.

When an email is returned, the email managing unit 132 reads out a scan image, mapped to a job ID, included in the email and information included in the email according to a user inputting the job ID included in the returned email and resends the email. That is, the email managing unit 132 resends an email when a job ID thereof displayed through the user interface unit 11 is input by the user through the user interface unit 11. Alternatively, the email managing unit 132 may resend the email when the job ID is input through a web link.

As illustrated in FIG. 3, since information included in an email, storage information of a scan image, etc., are mapped to a job ID, if the user recognizes the job ID included in a returned email and then inputs the job ID through the user interface unit 11, information mapped to the job ID is read out from the storage unit 14. Accordingly, the user may resend the same email by reading out results obtained by a previous scan-to-email operation through input of the job ID without repeating the previously performed scan-to-email operation.

Figure 5:
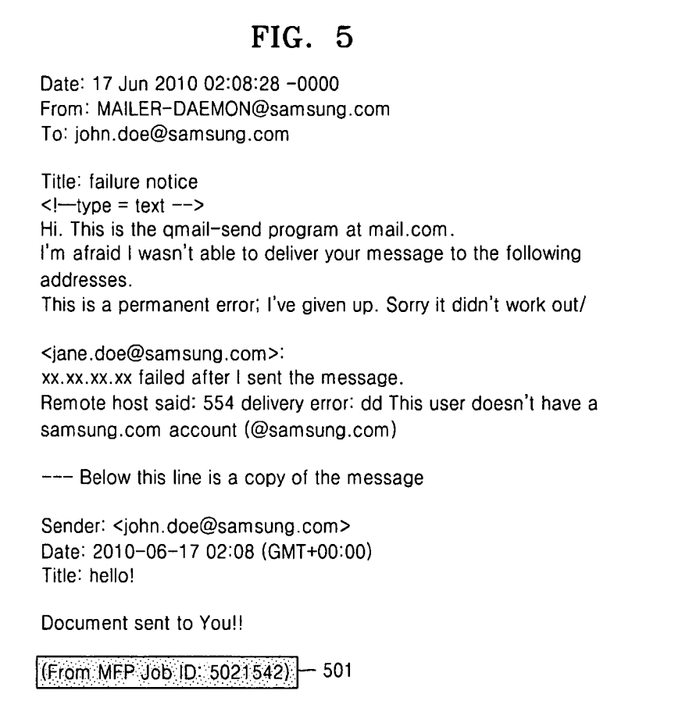
FIG. 5 illustrates a returned email, according to an embodiment.

FIG. 5 illustrates a returned email, according to an embodiment.

Referring to FIG. 5, the returned email includes a job ID 501, and thus a user may open the returned email through the user interface unit 11 and recognize the job ID 501 displayed on the user interface unit 11. Alternatively, the user may recognize the job ID 501 displayed on a web page through a web link.

Figure 6:
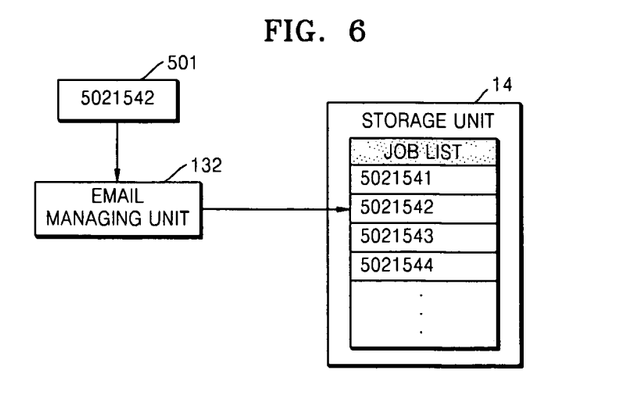
FIG. 6 is a block diagram for explaining a process of resending email through input of a job identifier, according to an embodiment.

FIG. 6 is a block diagram for explaining a process of resending email through input of a job ID, according to an embodiment.

Referring to FIG. 6, for example, when the job ID 501 of 5021542 is input by a user, the email managing unit 132 reads out information mapped to the job ID 501 of 5021542 stored in the storage unit 14. Afterwards, the email managing unit 132 resends the email according to the read out information.

According to the above, unlike the conventional method, even though an email is returned, the image forming apparatus 1 of the current embodiment does not need to repeat a previously performed scan-to-email operation in order to resend the email, because results obtained by the previous scan-to-email operation are mapped to a job ID and the results are read out when the job ID is input and thus the same email may be resent.

Figure 7:
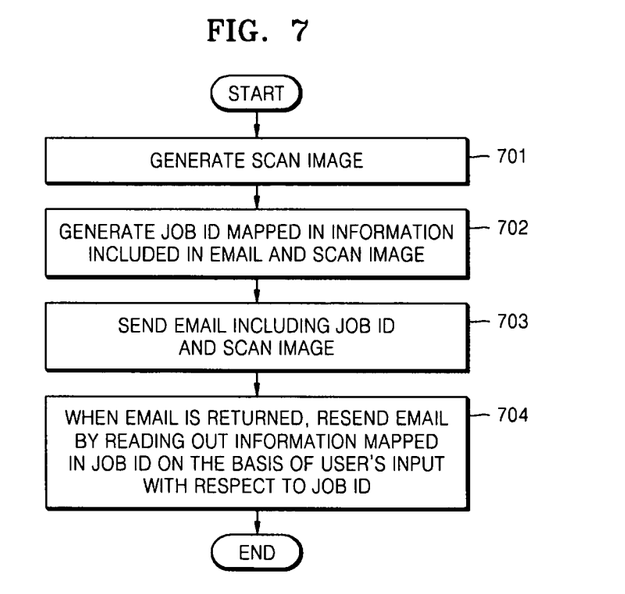
FIG. 7 is a flowchart for explaining a method of sending email in an image forming apparatus, according to an embodiment.

FIG. 7 is a flowchart for explaining a method of sending email in an image forming apparatus, according to an embodiment.

Referring to FIG. 7, the method of sending email in the image forming apparatus includes sequentially performed operations, wherein the operations have already been described with respect to the image forming apparatus 1 illustrated in FIG. 1. Accordingly, although omitted below, the above description with regard to the image forming apparatus 1 of FIG. 1 may be used in the method of sending email in the image forming apparatus of the current embodiment.

At operation 701, the scanning unit 12 generates a scan image by scanning a document to be sent to an email address via email.

At operation 702, the job ID managing unit 131 generates a job ID mapped to information included in the email and the generated scan image.

At operation 703, the email managing unit 132 sends the email including the job ID and the scan image via a mail server.

At operation 704, when the email is returned, the email managing unit 132 resends the email by reading out the information included in the email and the scan image, which are mapped in the job ID, according to a user inputting the job ID included in the returned email.

Figure 8:
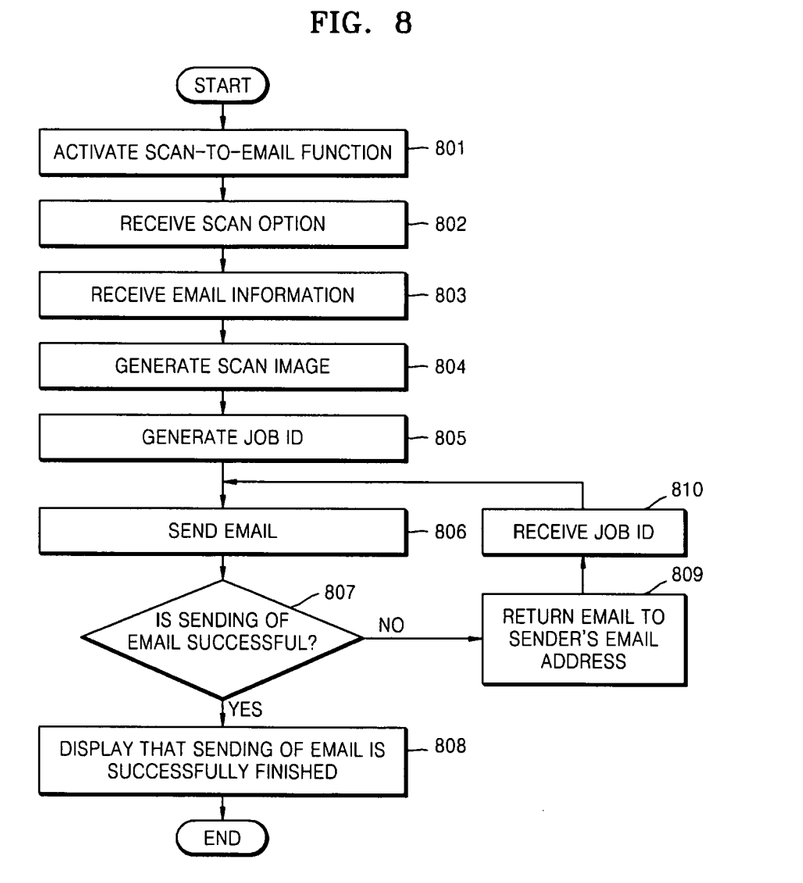
FIG. 8 is a detailed flowchart for explaining a method of sending email in the image forming apparatus of FIG. 7.

FIG. 8 is a detailed flowchart for explaining the method of sending email in the image forming apparatus of FIG. 7.

At operation 801, a user activates a scan-to-email function of the image forming apparatus 1 through the user interface unit 11.

At operation 802, the user interface unit 11 receives a scan option from the user.

At operation 803, the user interface unit 11 receives information to be included in an email from the user.

At operation 804, the scanning unit 12 generates a scan image by scanning a document to be sent to an email address via the email.

At operation 805, the job ID managing unit 131 generates a job ID mapped to the information included in the email and the scan image.

At operation 806, the email managing unit 132 sends the email including the job ID and the scan image to a mail server.

At operation 807, the email managing unit 132 checks whether the email is successfully sent. The successful sending of the email is determined based on, for example, whether the sent email is returned.

At operation 808, when the email is successfully sent, the user interface unit 11 displays that the sending of the email has successfully finished to the user.

At operation 809, when the email is not successfully sent, the sent email is returned to a sender's email address included in the email.

At operation 810, the user interface unit 11 receives the job ID from the user. When the job ID is input, the email managing unit 132 reads out the scan image and the information included in the email, which are mapped to the job ID.

Figure 9:
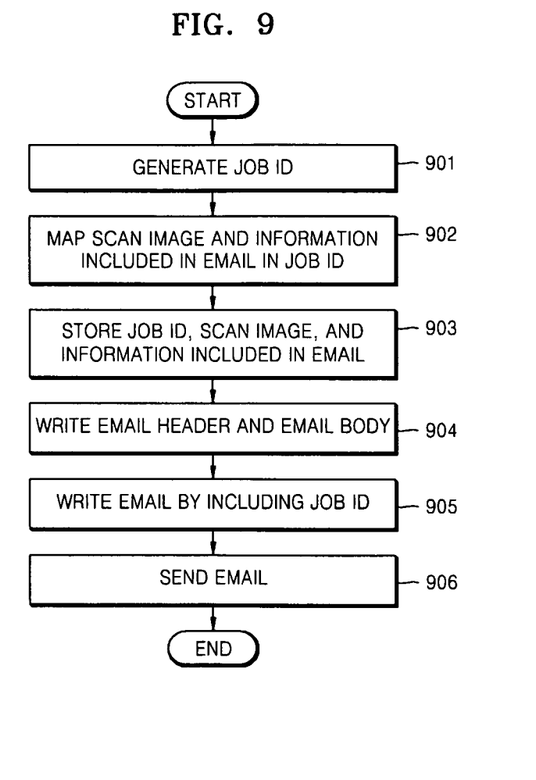
FIG. 9 is a flowchart for explaining a process of sending email by generating a job identifier, according to an embodiment.

FIG. 9 is a flowchart for explaining a process of sending email by generating a job ID, according to an embodiment.

At operation 901, the job ID managing unit 131 generates a job ID.

At operation 902, the job ID managing unit 131 maps a scan image and information included in an email to the job ID.

At operation 903, the storage unit 14 stores the job ID, the scan image, and the information included in the email.

At operation 904, the email managing unit 132 forms an email header and an email body.

At operation 905, the email managing unit 132 forms an email by including the job ID in the formed email body.

At operation 906, the email managing unit 132 sends the email.

Figure 10:
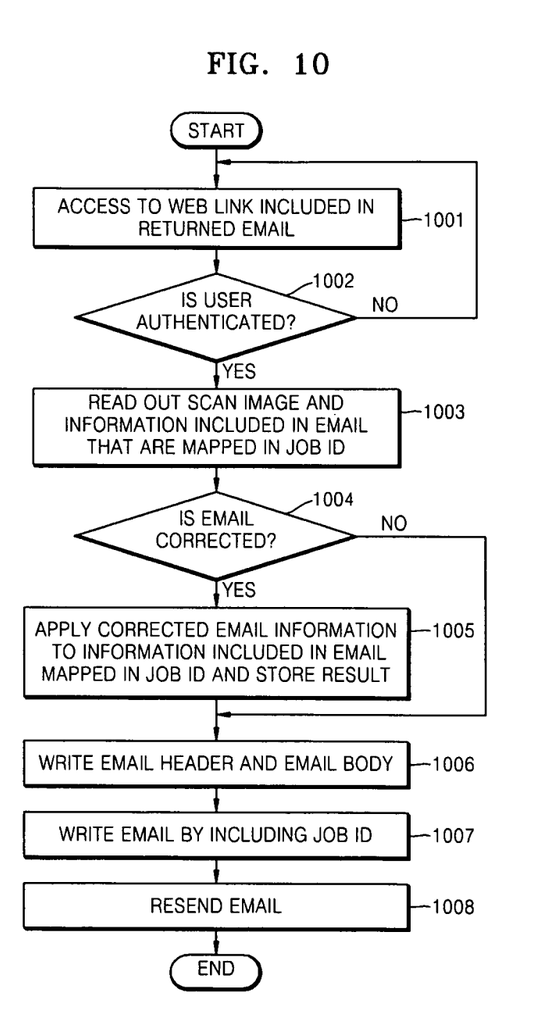
FIG. 10 is a flowchart for explaining a method of resending returned email, according to another embodiment.

FIG. 10 is a flowchart for explaining a method of resending returned email, according to another embodiment.

At operation 1001, a user accesses a web link included in a returned email.

At operation 1002, a web server disposed inside the image forming apparatus 1 authenticates the user that has accessed the web link.

At operation 1003, the email managing unit 132 reads out a scan image and information included in the email that are mapped to a job ID stored in the storage unit 14.

At operation 1004, the email managing unit 132 checks whether the user has corrected information of the email through the user interface unit 11.

At operation 1005, the storage unit 14 applies the corrected email information to the information included in the email mapped to the job ID and stores the result.

At operation 1006, the email managing unit 132 forms an email header and an email body.

At operation 1007, the email managing unit 132 forms the email by including the job ID in the formed email body.

At operation 1008, the email managing unit 132 resends the email.

According to the above, when sending of an email to which a scan image is attached fails, the previously sent email to which the scan image is attached may be resent without having to scan a document or input email information again. Accordingly, in the event that sending of an email has failed, a scanning operation and rewriting of the email may be minimized, thereby providing convenience to a user.

The present disclosure can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and etc. The computer readable recording medium can also be distributed over network coupled computer systems so that the computer readable code is stored and executed in a distributed fashion.

While the present disclosure has been particularly shown and described with reference to exemplary embodiments thereof, it will be understood by one of ordinary skill in the art that various changes in form and details may be made therein without departing from the spirit and scope as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of performing a scan-to-email function for sending email to which a scan image is attached in an image forming apparatus, the method comprising:
    generating a scan image by scanning a document to be sent to an email address via an email;
    generating a job identifier (job ID) mapped to information included in the email and the generated scan image;
    storing the generated scan image, the information included in the email, and the generated job ID;
    sending the email including the job ID and the generated scan image via a mail server; and
    when the email fails to be delivered to the email address and is returned, sending another email by reading out the stored scan image and the information included in the email which is mapped to the job ID according to a user inputting the job ID which is included in the returned email.

2. The method of claim 1, wherein information regarding the user, a scan option to generate the scan image, the information included in the email, and storage information of the generated scan image are mapped to the job ID.

3. The method of claim 1, wherein different job IDs are respectively assigned to different scan-to-email operations performed by using the scan-to-email function.

4. The method of claim 1, wherein email data is divided into an email header and an email body, and the job ID is included in the email body.

5. The method of claim 1, further comprising displaying the job ID included in the returned email to the user, and wherein the sending of another email comprises sending the another email when the displayed job ID is input by the user.

6. A non-transitory computer readable recording medium having embodied thereon a computer program to execute the method of claim 1.

7. The method of claim 1, wherein the sending of the email further comprises sending information regarding a web link that communicates with a web server that sets a job to be performed in the image forming apparatus and is disposed inside the image forming apparatus, by including the information regarding the web link in the email.

8. The method of claim 7, wherein the sending of another email comprises sending the another email when the job ID is input through the web link.

9. The method of claim 7, wherein email data is divided into an email header and an email body, and the email body includes the web link which includes the job ID.

10. An image forming apparatus having a scan-to-email function to send email to which a scan image is attached, the image forming apparatus comprising:
- a scanning unit to generate a scan image by scanning a document to be sent to an email address via an email;
- a job ID managing unit to generate a job ID mapped to information included in the email and the generated scan image;
- a storage unit to store the generated scan image, the information included in the email, and the generated job ID; and
- an email managing unit to send the email including the job ID and the generating scan image via a mail server,
- wherein when the email fails to be delivered to the email address and is returned, the email managing unit sends another email by reading out the stored scan image and the information included in the email mapped to the job ID according to a user inputting the job ID included in the returned email.

11. The image forming apparatus of claim 10, wherein information regarding the user, a scan option to generate the scan image, the information included in the email, and storage information of the generated scan image are mapped to the job ID.

12. The image forming apparatus of claim 10, wherein email data is divided into an email header and an email body, and the job ID is included in the email body.

13. The image forming apparatus of claim 10, wherein different job IDs are respectively assigned to different scan-to-email operations performed by using the scan-to-email function.

14. The image forming apparatus of claim 10, further comprising a user interface unit to display the job ID included in the email to the user when the email is returned,
wherein the email managing unit sends the another email when the displayed job ID is input by the user.

15. The image forming apparatus of claim 10, wherein the email managing unit sends information regarding a web link communicating with a web server that sets a job to be performed in the image forming apparatus and is disposed inside the image forming apparatus, by including the information regarding the web link in the email.

16. The image forming apparatus of claim 15, wherein when the email is returned, if the job ID is input through the web link, the email managing unit sends the another email.

17. The image forming apparatus of claim 15, wherein email data is divided into an email header and an email body, and the email body includes the web link which includes the job ID.

* * * * *